United States Patent
Schneck et al.

(10) Patent No.: US 12,054,430 B2
(45) Date of Patent: Aug. 6, 2024

(54) METHOD OF PRODUCING A CARBON-CERAMIC SHAPED BODY WITH AN OPEN POROSITY OF FROM 15 TO 60%

(71) Applicant: DEUTSCHE INSTITUTE FÜR TEXTILUND FASERFORSCHUNG DENKENDORF, Denkendorf (DE)

(72) Inventors: Tanja Schneck, Filderstadt (DE); Frank Hermanutz, Leonberg (DE)

(73) Assignee: Technikum Laubholz GmbH, Göppingen (DE)

(*) Notice: Subject to any disclaimer, the term of this patent is extended or adjusted under 35 U.S.C. 154(b) by 593 days.

(21) Appl. No.: 17/280,081

(22) PCT Filed: Sep. 26, 2019

(86) PCT No.: PCT/EP2019/076117
§ 371 (c)(1),
(2) Date: Mar. 25, 2021

(87) PCT Pub. No.: WO2020/064972
PCT Pub. Date: Apr. 2, 2020

(65) Prior Publication Data
US 2022/0041511 A1 Feb. 10, 2022

(30) Foreign Application Priority Data
Sep. 27, 2018 (DE) .................... 10 2018 123 946.7

(51) Int. Cl.
| | | |
|---|---|---|
| *C04B 35/565* | (2006.01) | |
| *C04B 35/83* | (2006.01) | |
| *C04B 38/00* | (2006.01) | |
| *C04B 41/45* | (2006.01) | |
| *C04B 41/50* | (2006.01) | |

(52) U.S. Cl.
CPC ............ *C04B 35/565* (2013.01); *C04B 35/83* (2013.01); *C04B 38/0022* (2013.01); *C04B 41/4523* (2013.01); *C04B 41/5096* (2013.01)

(58) Field of Classification Search
CPC ... C04B 35/565; C04B 35/83; C04B 38/0022; C04B 41/4523; C04B 41/5096; C04B 2235/6562; C04B 2235/77; C04B 2235/96; C04B 35/573; C04B 2235/5248; C04B 2235/5256; C04B 2235/616; C04B 35/6365; D01D 5/247; D01F 9/14
See application file for complete search history.

(56) References Cited

U.S. PATENT DOCUMENTS 4,396,663 A * 8/1983 Mitchell ................. B32B 18/00
156/291

FOREIGN PATENT DOCUMENTS

| | | |
|---|---|---|
| DE | 102005002633 A1 | 7/2006 |
| DE | 102006044848 A1 | 1/2008 |
| JP | 2006027973 A | 2/2006 |
| WO | 2003050058 A1 | 6/2003 |
| WO | 2008006900 A1 | 1/2008 |
| WO | 2013098203 A2 | 7/2013 |

OTHER PUBLICATIONS

CN 1189862 A (Year: 2023).*
JP 3600642 B2 (Year: 2023).*
JP 3942199 B2 (Year: 2023).*
JP 4571369 B2 (Year: 2023).*
International Preliminary Report on Patentability for PCT Application No. PCT/EP2019/076117, Dated Dec. 14, 2020, 5 pages.

* cited by examiner

*Primary Examiner* — Xiao S Zhao
*Assistant Examiner* — Guy F Mongelli
(74) *Attorney, Agent, or Firm* — Lippes Mathias LLP

(57) ABSTRACT

The invention relates to a method of producing a carbon-ceramic shaped body comprising a carbon fibre-reinforced carbon matrix and a content of silicon carbide and silicon, characterised in that a carbonisable shaped body having an organic matrix based on cellulose and reinforced with carbonisable textile structures has been carbonised to form a porous shaped body and the porous carbonised shaped body is then subjected to a liquid silicisation to give the carbon-ceramic shaped body. This method is performable in an economically advantageously manner without losing the beneficial properties achievable according to the prior art.

15 Claims, No Drawings

METHOD OF PRODUCING A CARBON-CERAMIC SHAPED BODY WITH AN OPEN POROSITY OF FROM 15 TO 60%

The invention relates to a method of producing a carbon-ceramic shaped body comprising a carbon fibre-reinforced carbon matrix and a content of silicon carbide and silicon.

If reference is made in the context of the later presentation of the present invention to the production of e carbon-ceramic shaped body, this relates to a carbon fibre-reinforced silicon carbide composite material of the type described above. This material could also be referred to using the term "carbon fibre-reinforced silicon carbide" or "C-fibre-reinforced SiC" or, as introduced in the class of composite material ceramics, "C/SiC" for short. The following abbreviations are generally still common: C/SiC, meaning silicon carbide in a carbon matrix; C/C-SiC-Si, meaning that the carbon matrix contains carbon fibres (C/C) and also SiC and Si. These further explanations are intended to make it easier for a person skilled in the art to apply the terms used in the technical literature insightfully to the present invention.

It has long been known that the oxidation and temperature resistance of fibre-reinforced carbon composite materials can be increased by silicon coating. Carbon fibre-reinforced composite materials, especially with an SiC matrix, are used primarily. The disadvantage here is an increase in costs due to additional materials, such as polymer matrices, and/or due to additional method steps, such as separate carbonisation of the precursor fibres and the polymer matrix, and thus an increased energy input. According to the prior art, the production of fibre-reinforced ceramics starting from precursor fibres is also known. In EP 2 041 044 A1, an Si/SiC composite material is described which is produced by silicising papers consisting also of carbonising filler and binder in addition to cellulose fibres. In EP 1 284 251 A1, corrugated board is coated with a slurry or is placed in a slurry as the starting material, is pyrolysed, and is then silicised. This process yields inhomogeneous ceramic composite materials that exhibit correspondingly lower mechanical properties. The advantage of the teaching of WO 2005049524 A1 is that the cellulose fibres are mixed with the metal powder at the beginning, which achieves a homogeneous distribution of the metal in the composite and thus better mechanical properties, however, a large amount of metal has to be introduced beforehand. Overall, these ceramic composite materials have very high Si or SiC contents.

It is known that C/C composites have excellent properties in an inert atmosphere. In order to improve the oxidation behaviour of C/C composites, the C/C composites are reacted with Si to obtain the known C/Si or C/C-SiC composites. The prior art shows that the microstructure of the carbon precursor has an essential influence on the subsequent properties of the C/C-SiC body. The microstructure can be influenced by the matrix precursor, the fibre structure, the process parameters and the fibre-matrix interface. During the carbonisation process, the conversion of the matrix polymer to the carbon matrix produces by-products that collect in pores. In addition, the conversion leads to a shrinkage behaviour of the matrix polymer, which is responsible for the formation of cracks, but is hindered in the fibre direction by the embedded reinforcement fibres. Any resulting by-products can be discharged from the composite material through this formed network of cracks. Due to the different coefficients of thermal expansion of the carbon fibres and the carbonised matrix, cooling of the carbonised fibre-reinforced composite material leads to internal stresses and thus to further stress cracks. Due to a weak fibre-matrix interface in the carbon fibre-reinforced composite material, delaminations between the fibres and the polymer matrix lead to the deterioration of the microstructure in the carbonised composite material. Subsequent liquid silicisation of these porous C/C precursors yields C/C-SiC composite materials, as described for example in D. Nestler et al., in 6th International Munich Chassis Symposium (Ed.: P. E. Pfeffer), Springer Vieweg, pp. 605-627 (2015), is already known. In this process, the silicon melt is infiltrated into the porous carbon precursor via capillary forces and reacts with the carbon skeleton to form silicon carbide. Silicising a porous C/C precursor with a high degree of delamination and segmentation cracks leads to a high conversion of the fibres to SiC and thus to poorer mechanical properties of the C/C-SiC body. As a solution to improving the fibre-matrix interface, the process of coating the fibres with SIC or pyrolytic carbon is known from the literature, and is very costly and time-consuming (sh. V. Cui, A. Li, B. Li, X. Ma, R. Bai, W. Zhang, M. Ren, "Microstructure and ablation mechanism of C/C-SiC composites", Journal of the European Ceramic Society, vol. 34, pp. 171-177 (2014)). This coating of the fibres improves the fibre-matrix interface so that a specifically adapted C/C microstructure with dense segments of fibre bundles is obtained.

It is therefore apparent that the method described at the outset for producing a carbon-ceramic shaped body is in need of improvement. This gives rise to the problem addressed by the present invention of further developing this method so that it can be carried out while reducing costs and avoiding additional materials, such as polymer matrices, and/or additional method steps, such as a separate carbonisation of a precursor fibre and the polymer matrix. Furthermore, the advantageous properties of carbon-ceramic shaped bodies known from the prior art should not be lost in the method according to the invention; especially, high values of the elongation at break, the flexural modulus and the apparent interlaminar shear strength should be maintained.

The stated problem is addressed in accordance with the invention by a method of producing a carbon-ceramic shaped body comprising a carbon fibre-reinforced carbon matrix and a content of silicon carbide and silicon in that a carbonisable shaped body having an organic matrix based on cellulose and reinforced with carbonisable textile structures has been carbonised to form a porous shaped body and the porous carbonised shaped body is then subjected to a liquid silicisation to give the carbon-ceramic shaped body. It is preferred here that the cellulose is of natural origin or is used in the form of a carbonisable dissolving pulp or carbonisable paper pulp. It is also advantageous if the degree of polymerisation of the cellulose is optimised, preferably is between approximately 108 and 5000, especially between approximately 250 and 2000.

The especial advantage of the method according to the invention is that a wide variety of carbonisable textile structures can be used, preferably in the form of fibres, especially endless fibres, short fibres or staple fibres, as well as yarns and/or planar textile structures. The planar textile structures are preferably in the form of woven fabric, warp knitted fabric, weft knitted fabric, braiding, laid scrim, winding or nonwoven fabric. It is especially advantageous if the carbonisable fibres are carbonisable natural fibres and/or carbonisable synthetic fibres and the carbonisable planar textile structures are based on the carbonisable natural fibres and/or carbonisable synthetic fibres. It is preferred that the natural fibres are seed fibres, especially of cotton, bast fibres, especially of flax, hemp, jute, kinap, ramie, abaca, rosenna and/or arena, hard fibres, especially of alpha or esparto grass, fique, henequen, coconut, manila, porphium and/or glisal, animal fibres, especially of wool or fine and coarse animal hair, wood fibres, leaf fibres and/or silk. Furthermore, it is preferred if the carbonisable synthetic fibres, especially based on modified natural substances of plant origin, are cuprammonium rayon fibres, viscose fibres, modal fibres, artificial silk and cellulose acetate fibres, especially as acetate or triacetate, alginate fibres, polyisoprene fibres or synthetic fibres, especially elasto fibres, fluoro fibres, polyacrylic fibres, especially based on polyacrylonitrile or modacryl, polyimide fibres, especially nylon or aramide fibres, polychloride fibres, especially based on polyvinylchloride and polyvinylidene chloride, polyester fibres, polyolefin fibres, especially based on polyethylene and polypropylene, or polyvinyl alcohol fibres. For optimum execution of the method according to the invention in respect of the method objective, it is advantageous if the proportion of carbonisable textile structures, especially in the form of fibres, in the carbon-ceramic shaped body is between approximately 10 and 90 wt. %, especially between approximately 20 and 75 wt. %. Lastly, it can be stated as advantageous that the carbonisable shaped body as starting material of the method according to the invention is planar, it being especially preferred that a plurality of planar shaped bodies are pressed together.

It seems expedient to provide a skilled person with a few pieces of information that will help him to produce the carbonisable shaped body as described above. The following technical information could serve here as a long-known guideline for a person skilled in the art. According to this, a preferred method for producing a carbonisable shaped body used in accordance with the invention relates to a procedure in which the cellulose in the form of pulp and/or in the form of cellulose of natural origin is dissolved in a molten ionic liquid, with the amount of cellulose in the resulting cellulose-containing solution system expediently being approximately 2 to 30 wt. %, especially approximately 4 to 15 wt. %, the cellulose-containing solution system, optionally with incorporated property-changing additives, being mixed with a textile structure and this mixing system being introduced into a coagulation medium, especially into an aqueous coagulation medium, for coagulation of the cellulose contained in the solution system, and the shaped body produced by coagulation being washed and dried. In this case, the temperature of the molten ionic liquid is preferably set to less than approximately 160° C., especially less than approximately 130° C., and/or to more than approximately 20° C., especially more than approximately 30° C. It is further preferred if the solution system has a zero viscosity (measured with a rotational viscometer) between approximately 2 and 1000 Pa·s, especially between approximately 10 and 250 Pa·s. Furthermore, it is considered advantageous if, as coagulants, the coagulation medium contains water, monoalcohols, especially methanol, ethanol, propanol and/or butanol, polyhydric alcohols, especially glycerol, ethylene glycol, diethylene glycol, triethylene glycol, 1,4-butanediol, 1,2-propanediol, 1,3-propanediol and/or 1,6-hexanediol, or mixtures of these coagulants. Here, it is expedient if the coagulation medium comprises the coagulant in an amount of from approximately 5 to 95 wt. %, especially from approximately 20 to 80 wt. %. It is especially advantageous if prior to the mixing with the textile structures, the cellulose-containing solution system is set to approximately 10 to 140° C., especially to approximately 40 to 120° C., and/or the coagulation medium is set to a temperature of from approximately 20 to 90° C., especially approximately 20 to 60° C. It is of especial advantage with regard to the further procedure according to the invention if, after formation of the dried shaped body, further shaping is carried out in a heating press and/or by mechanical action, especially cutting, or thereupon a surface treatment or a chemical action, especially adhesive bonding. With regard to the choice of the particular ionic liquid, the invention is not subject to any substantial limitations. Especially, ionic liquids based on imidazolium, oxazolium, thiazolium, piperidinium, pyrrolidinium and guinolinium may be used, for example.

The above-described starting shaped body of the method according to the invention with an organic matrix based on cellulose and reinforced with carbonisable textile structures is carbonised in accordance with the invention in an intermediate step to form a porous shaped body. Here, the following approach is preferably adopted:

The previously known shaped body from WO 2013098203 A2 (claim 35) is further processed into a porous carbonised shaped body (C/C shaped body). For this purpose, the above-mentioned shaped body is carbonised, especially in an inert gas atmosphere. Carbonisation takes place at a temperature between approximately 400° C. and 3000° C. especially between approximately 700° C. and 2400° C. During carbonisation of the carbonisable shaped body, a heating rate of between approximately 0.5 K/min and 10 K/min, especially approximately 1 K/min and 5 K/min, is sought. When carbonising a two-dimensional shaped body, it is recommended to use weights to weigh it down in order to counteract deformation during carbonisation, implied by the shrinkage behaviour.

As expected, in light microscopy images the carbonised shaped body shows a compact C/C structure with isolated pores that form in the shaped body due to the pyrolysis products formed. The compactness of the carbon structure of the carbonised shaped body can be attributed to the high fibre-matrix adhesion. Compared to other known carbonised shaped bodies based on carbon fibres and thermoplastic or thermosetting plastics, the C/C shaped body according to the invention shows a high fibre-matrix adhesion without the need for a previously performed fibre finishing, and thus no further method steps are necessary. A further advantage of this carbonised shaped body is that the carbonisation of the precursor fibre, corresponding to the cellulose fibre, is not carbonised beforehand, but the entire shaped body is subjected to carbonisation in one piece, which again saves a process step.

The carbonised shaped body has a carbon yield of between approximately 10% and 40%, especially from approximately 15% to 35%. In order to increase the residual carbon content, it is possible for a person skilled in the art to incorporate inorganic salt solutions in the textile structure. The inorganic solutions which are especially advantageous within the scope of the invention are phosphorus-containing salts, such as ammonium dihydrogen phosphate (ADHP) or salts of p-tosylate, such as ammonium p-tosylate. Supplementing the textile structure in this way before carbonisation leads to an increase in the carbon yield, so that a carbonised shaped body with a residual carbon content of more than approximately 30% is obtained.

The carbonisation is preferably controlled such that a porosity of approximately 5 to 80%, especially of approximately 20 to 55%, is established in the porous carbonised shaped body. This control is achieved in such a way that the microstructure in the carbonisable textile structure is created by different factors, such as the solution system in which the proportion of dissolved cellulose in a molten ionic liquid is varied, the exposure time of this solution system before it is removed by means of a coagulation medium and/or by the addition of inorganic salt solutions which serve for supplementing the textile structure and thus for increasing the carbon yield. Furthermore, control can also be provided by the carbonisation program.

The method according to the invention is then continued by placing the porous carbonised shaped body in a container filled with silicon powder and/or granular silicon material, especially a graphite crucible, and heating it in a vacuum and/or protective gas, especially argon or nitrogen, up to a temperature above the silicon melting point, the porous carbonised shaped body being infiltrated with the liquid silicon via capillary forces and the silicon reacting with the carbon of the carbonised shaped body. It is advantageous here that, following the reaction of the silicon with the carbon of the porous carbonised shaped body, the shaped body is cooled, especially under application of a vacuum.

In the context of the continuation of the method according to the invention, attention should also be paid to the extent to which the porous carbonised shaped body is infiltrated with liquid silicon. Here, it has proved to be advantageous if the carbon-ceramic shaped body has a weight increase of approximately 30 to 140 wt. %, especially of approximately 55 to 110 wt. %, compared with the precursor in the form of the porous carbonised shaped body.

Further Information on Silicisation:

The last step of the invention is rounded off by the silicisation of the carbonised shaped body. For this, the silicisation with liquid silicon known in the prior art is used (see for example D. Nestler et al., in 6th International Munich Chassis Symposium (Ed.: P. E. Pfeffer), Springer Vieweg, pp. 605-627 (2015)). The porous carbonised shaped body to be silicised, which preferably has to be completely permeated by an open pore system, is placed for example in a graphite container, the bottom of which is filled with silicon powder and/or granular silicon material. The so-called wick technique has proved to be advantageous. For this, the porous shaped body to be silicised is placed on a carbon body in the form of wicks, which have a very absorbent behaviour in relation to the silicon. These wicks are partly in the silicon powder and/or granular silicon material, so that the liquid silicon can rise through the wicks and further infiltrate the shaped bodies to be silicised. Due to these wicks, there is no direct contact between the porous carbonised shaped body to be silicised and the liquid silicon, which has proven to be advantageous in that there is no need for a time-consuming removal of excess silicon from the silicised carbon-ceramic shaped body. Due to the excellent wettability of silicon to carbon, infiltration of the crack system in the carbonised shaped body is effected by capillary forces. The silicon infiltrated in this way can thus react there with the matrix carbon to form silicon carbide. The conversion to silicon carbide serves as a diffusion barrier against the liquid silicon, so that the liquid silicon is prevented from penetrating further into the matrix as far as the embedded carbon fibre reinforcement in order to attack this as well.

In the case of liquid silicisation, it is advantageous if the porous carbonised shaped body is infiltrated with liquid silicon in the temperature range from approximately 1450° C. to 2200° C., especially between approximately 1600° C. and 1700° C. in a vacuum or especially at temperatures from approximately 1400° C. to 2200° C., especially from approximately 1500° C. to 2000° C., in inert gas. If silicisation in a vacuum is chosen as the process condition, it is preferable to ensure that residues of reactive gases are completely removed beforehand by purging with inert gas. A fast heating rate can be selected here. An impregnation and reaction time of approximately 10 minutes to 1 hour, preferably a reaction time of approximately 30 minutes, is suitable.

The product of the method according to the invention in the form of the carbon-ceramic shaped body has a large number of advantageous properties, such as a pore volume through which a fluid is accessible of at most approximately 15% (according to DIN EN 1389:2004-03), especially preferably of not more than approximately 12% and/or an elongation at break in the range of from approximately 0.16% to 0.21% (according to DIN EN 658-3:2002-11) and/or an apparent interlaminar shear strength of approximately 0.5 to 5 MPa (according to DIN EN 658-5:2003-03), especially of approximately 1 to 4 MPa. These advantageous mechanical properties are obtained in a manner that is favourable from a procedural viewpoint, especially by reducing the number of method steps required in the prior art, such as a separate carbonisation of the precursor fibre and the particular polymer matrix. Further advantageous properties of the carbon-ceramic shaped body obtained according to the invention are the high flexural strength, the high thermal shock resistance, good thermal conductivity and resistance to oxidative effects. Due to its low density, it is used in plant engineering, lightweight construction and mechanical engineering. Thanks to its low thermal expansion and high specific strength, it is also used in aerospace applications. Specific examples are charging racks for the heat treatment of metal parts or for low-expansion, highly rigid telescope structures for telecommunications and satellite construction. In contrast to monolithic ceramics, it is suitable in the form of high-performance brakes and friction linings in automotive engineering and high-performance lifts. Thanks to its low weight and high fracture toughness, the carbon-ceramic shaped body according to the invention can also be used in the form of armour and in the processing of parts for gas turbines. Due to its low coefficient of thermal expansion and high thermal stability, it can also be used as a thermal protection system panel. By using inexpensive cellulose as a reinforcement fibre in the method according to the invention and also as a matrix, the manufacturing costs are noticeably reduced compared to those of the prior art methods. Thanks to the renewable bio-based raw material mentioned, the $CO_2$ balance can also be reduced.

Overall, the following advantages associated with the present invention have been ascertained: Savings in process steps and energy during production, since carbonisation leads directly to the porous carbonised shaped body; broad applicability thanks to excellent properties; cost savings in production due to the use of inexpensive starting materials (cellulose); use of raw materials from renewable resources; desired shaping of the shaped parts or components possible already from the precursor, whereby additional processing steps are bypassed.

Lastly, the above-described invention will be explained in greater detail generally and comprehensively, also under consideration of technological aspects:

The non-carbonised reinforcement fibres are embedded by an organic matrix consisting of cellulose, so that chemical bonds can be formed due to the surface functionalities of the fibre and matrix, thereby strengthening the fibre-matrix adhesion. In the carbonisation step of the shaped body consisting of reinforcement fibres embedded in a matrix, this improved fibre-matrix bonding results in this bonding being further strengthened since the fibres and the matrix are carbonised simultaneously. This simultaneous carbonisation causes the carbon matrix to perfectly surround the reinforcement fibre that has been converted into a carbon fibre. Thus, the silicisation in the final method step does not cause the reinforcement fibres transformed into carbon fibre to react with the liquid silicon to form silicon carbide. Ultimately, an Si uptake of approximately 55% to 110% can be recorded for the prior art carbon-ceramic shaped body according to the invention after silicisation, compared to 53% for the prior art C/C-SiC shaped bodies. The carbon-ceramic matrix of the carbon-ceramic shaped body comprises mainly approximately 40 to 75 wt. % of silicon carbide, especially approximately 50 to 60 wt. %, and also of approximately 1 to 15 wt. % of free silicon, preferably approximately 2 to 11 wt. % of free silicon, and preferably approximately 20 to 60 wt. % of carbon, especially approximately 25 to 50 wt. % of carbon. After silicisation, the reinforcement fibres continue to be embedded intact in the ceramic matrix by virtue of the fact that the carbon matrix completely enclosed the reinforcement fibres in the previous method step and thus prevented the liquid Silicon from penetrating through to the carbonised reinforcement fibre. Therefore, substantially only the carbon matrix of the carbonised shaped body is converted to silicon carbide during the silicisation, which especially preferably has not completely reacted into silicon carbide, but still consists of carbonised carbon matrix, whereby the mechanical properties of the carbon-ceramic shaped body are advantageously influenced.

The mass loss and volume shrinkage influenced by the carbonisation completes the crack structure in the fibre-reinforced carbonised shaped body. The pyrolysis gases trapped in the pores can then escape via the applied crack pattern, causing it to branch with the pores and thus achieving an open-pored structure in the carbonised shaped body. With regard to silicisation, an open-pored structure is advantageous. The crack structure of the prior art fibre-reinforced shaped bodies is difficult to adjust, since the fibre-matrix bond must be adjusted accordingly. In the carbonised shaped body according to the invention, it is possible for a person skilled in the art to adjust the open-pore structure depending on the requirements of the final product. In this case is the good fibre-matrix bond is advantageous, so that desired cracks form only in the matrix and the reinforcement fibres remain largely intact during silicisation. The open porosity of the carbonised shaped body can be adjusted by the concentration of the matrix solution at the beginning of the production. An open porosity in the range of approximately 15% to 60%, especially approximately 20% to 55%, can be achieved. The open porosity in the carbonised shaped body further influences the silicon uptake and the open porosity in the shaped body obtained according to the invention. A high open porosity in the carbon fibre-reinforced shaped body leads to a high silicon uptake which is possible up to more than 100%. The porosity of the carbon-ceramic shaped body according to the invention consisting of fibre-reinforced silicon carbide is in the range of from approximately 5% to 13%, especially from approximately 2% to 45%, whereby a very compact structure is obtained in the silicised carbon-ceramic shaped body. The open porosity then also allows the mechanical properties of the shaped body according to the invention to be adjusted. Therefore, flexural moduli of up to approximately 9 MPa can be achieved, which are higher than the prior art shaped body, which was produced for comparison.

The invention is further explained with reference to the following examples.

Example 1

The method according to the invention is started with the product obtainable by the method of WO 2013098203 A2. More specifically: A cellulose fibre (more detailed definition: commercially available tyre cord fibre from the company Glanzstoff, 1 k filaments, 1840 dtex) is previously wetted by a 6% solution of cellulose in ethyl methylimidazolium acetate (EMIM acetate), wet-wound onto a metal mould measuring $18\times18\times0.1$ cm$^3$ in such a way that, after four layers, the metal mould is rotated by 90°. The metal mould is rotated six times so that a 24-layer shaped body is produced overall. This 24-layer shaped body is annealed at 70° C. for 45 min. The ionic liquid (EMIM acetate) serving as solvent is washed out three times in an aqueous coagulation bath. The shaped body is then dried in a heating press under a pressure of 6 N/cm$^2$ and at a temperature of 80° C. for 1 h. The carbonisation is carried out in a protective gas atmosphere in five steps: at the beginning, the shaped body is heated to 120° C. at a rate of 10 K/min. After a holding time of 30 min, heating up to 200° C. takes place at a rate of 5 K/min. A further reduction of the heating rate to 1 K/min up to 260° C. counteracts the shrinkage behaviour. The last temperature increase to 1650° C. is achieved with a heating rate of 5 K/min. After cooling, a carbonised shaped body with a carbon yield of 24% is provided. This carbonised shaped body is then silicised. This is combined with seven times the amount of ultra-pure silicon in powder form. The silicisation takes place in a vacuum at 1650° C. The subsequent cooling also takes place in a vacuum. The subsequent cooling also takes place in a vacuum up to a temperature of 150° C.

The result is a stable carbon-ceramic shaped body with a silicon absorption of 72% based on the carbonised shaped body. The carbon-ceramic shaped body according to the invention has an open porosity of 6%, a flexural modulus of 4.7 MPa, a fracture strength of 20.1 MPa and an apparent interlaminar shear strength of 2.7 MPa.

Example 2

Following Example 1, a cellulose fibre is previously wetted by a solution consisting of an 8% solution of cellulose in EMIM acetate and is wet-wound onto a metal mould measuring $18\times18\times0.1$ cm$^3$ in such a way that a 24-layer shaped body is produced. The subsequent method steps (washing, drying and carbonisation) are carried out as in Example 1 and result in a carbonised shaped body with a carbon yield of 22%. This is then silicised (see Example 1) to obtain a carbon-ceramic shaped body according to the invention.

The result is a stable carbon-ceramic shaped body with a silicon absorption of 104%, based on the carbonised shaped body. The obtained fibre-reinforced carbon-ceramic shaped body has an open porosity of 11%, a flexural modulus of 8.1 MPa, a fracture strength of 18.2 MPa and an apparent interlaminar shear strength of 1.1 MPa.

Example 3

A 24-layer shaped body wound from cellulose is produced as described in Example 1. The ionic liquid (EMIM acetate) serving as solvent is washed out three times in a coagulation bath consisting of an aqueous 0.4 M ADHP solution (ADHP: ammonium dihydrogen phosphate), while at the same time the shaped body is supplemented with ADHP. The subsequent method steps (drying and carbonisation) are carried out as in Example 1 and result in a carbonised shaped body with a carbon yield of 31%. Subsequently, silicisation is carried out according to the procedure in Example 1 to obtain the carbon-ceramic shaped body according to the invention.

The result is a stable carbon-ceramic shaped body with a silicon absorption of 59%, based on the carbonised shaped body. The obtained fibre-reinforced carbon-ceramic shaped body has an open porosity of 6%, a flexural modulus of 11 MPa, a fracture strength of 45.1 MPa and an apparent interlaminar shear strength of 2.5 MPa.

The invention claimed is:

1. A method of producing a carbon-ceramic shaped body comprising a carbon fibre-reinforced carbon matrix and a content of silicon carbide and silicon, characterised in that a carbonisable shaped body having an organic matrix based on cellulose and reinforced with carbonisable fibres is provided, wherein the fibres are based on carbonisable synthetic fibres of modified natural substances of plant origin, the carbonisable shaped body is then carbonised to form an open-pore porous carbonized shaped body with an open porosity of from 15 to 60% and the open-pore porous carbonised shaped body is then subjected to a liquid silicisation to give the carbon-ceramic shaped body.

2. The method according to claim 1, characterised in that the cellulose is of natural origin or is used in the form of a carbonisable dissolving pulp or carbonisable paper pulp.

3. The method according to claim 1, characterised in that the cellulose has a degree of polymerisation of between approximately 108 and 5500.

4. The method according to claim 1, characterised in that the carbonizable synthetic fibres are cuprammonium rayon fibres, viscose fibres, modal fibres or artificial silk fibres.

5. The method according to claim 1, characterised in that the carbonisable shaped body comprises the carbonisable textile structure in a proportion of between 10 and 90 wt. %.

6. The method according to claim 1, characterised in that the carbonisable shaped body is planar.

7. The method according to claim 6, characterised in that the carbonizable shaped body is obtained by pressing a plurality of planar shaped bodies together.

8. The method according to claim 1, characterised in that the carbonisation is controlled such that an open porosity of from 20 to 55% is established in the open-pore porous carbonised shaped body.

9. The method according to claim 1, characterised in that the open-pore porous carbonised shaped body is placed in a container filled with silicon powder and/or granular silicon material and is heated in a vacuum and/or protective gas to a temperature above the silicon melting point to thus convert the silicon powder and/or granular silicon material to liquid silicon, the open-pore porous carbonised shaped body being infiltrated with the liquid silicon via capillary forces and the silicon reacting with the matrix carbon of the open-pore carbonised shaped body.

10. The method according to claim 9, characterised in that, following the reaction of the silicon with the carbon of the open-pore porous carbonised shaped body, the shaped body is cooled under application of a vacuum.

11. The method according to claim 9, characterized in that the container comprises a graphite crucible.

12. The method according to claim 1, characterised in that the open-pore porous carbonised shaped body is infiltrated with liquid silicon to such an extent that the carbon-ceramic shaped body, as compared to its open-pore porous carbonised shaped body precursor, has a weight increase of from approximately 30 to 140 wt. %.

13. The method according to claim 1, characterized in that the carbonisable fibres are in the form of a yarn.

14. The method according to claim 1, characterised in that the carbonisable fibres are in the form of a planar textile structure.

15. The method according to claim 14, characterised in that the carbonisable planar textile structure is present in the form of woven fabric, warp knitted fabric, weft knitted fabric, braiding, laid scrim, winding or nonwoven fabric.

* * * * *